(12) United States Patent
Han

(10) Patent No.: US 6,545,723 B1
(45) Date of Patent: Apr. 8, 2003

(54) DUAL HDTV/NTSC RECEIVING METHOD USING SYMBOL TIMING RECOVERY AND SYNC SIGNAL DETECTION AND APPARATUS THEREOF

(75) Inventor: Dong-seog Han, Anyang (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/579,156

(22) Filed: Dec. 27, 1995

(30) Foreign Application Priority Data

Dec. 27, 1994 (KR) .............................. 94-37542

(51) Int. Cl.[7] ................................ H04N 7/18
(52) U.S. Cl. ...................... 348/555; 348/556
(58) Field of Search ................ 348/474, 525, 348/554, 555, 556, 558, 725; 375/327, 345, 376

(56) References Cited

U.S. PATENT DOCUMENTS

| | | | |
|---|---|---|---|
| 5,283,653 A | * 2/1994 | Citta | 348/725 |
| 5,361,099 A | * 11/1994 | Kim | 348/555 |
| 5,388,127 A | * 2/1995 | Scarpa | 375/376 |
| 5,457,499 A | * 10/1995 | Lim | 348/474 |
| 5,461,427 A | * 10/1995 | Duffield et al. | 348/555 |
| 5,548,339 A | * 8/1996 | Kim | 348/525 |
| 5,636,252 A | * 6/1997 | Patel et al. | 375/345 |

\* cited by examiner

*Primary Examiner*—Andy Rao
(74) *Attorney, Agent, or Firm*—Sughrue Mion, PLLC

(57) ABSTRACT

A dual HDTV/NTSC receiver for recovering one of a HDTV signal and a NTSC signal coexisting in a desired channel includes a tuning unit for converting a desired one of HDTV signals and NTSC signals into an intermediate frequency (IF) signal, a sync detector, coupled to receive the IF signal for detecting a sync signal of the NTSC signal, a timing recovery unit, coupled to receive the IF signal for self-recovering symbol timing of the applied HDTV signal, and providing a symbol timing lock signal corresponding to the IF signal and an analog-to-digital converted HDTV signal, a controller for judging whether a currently received television signal is either a NTSC signal or a HDTV signal based on the sync detection result of the sync detector and the symbol timing lock signal from the timing recovery unit, and for outputting a control signal according to the determination result, and a tuning controller for initially controlling the tuning unit so that one desired HDTV signal is received, and for subsequently controlling the tuning unit on the basis of the signal selected by the control signal among respective HDTV and NTSC signals output, respectively, from the tuning unit and the timing recovery unit. The receiver automatically determines whether a received signal is the NTSC signal or the HDTV signal.

18 Claims, 3 Drawing Sheets

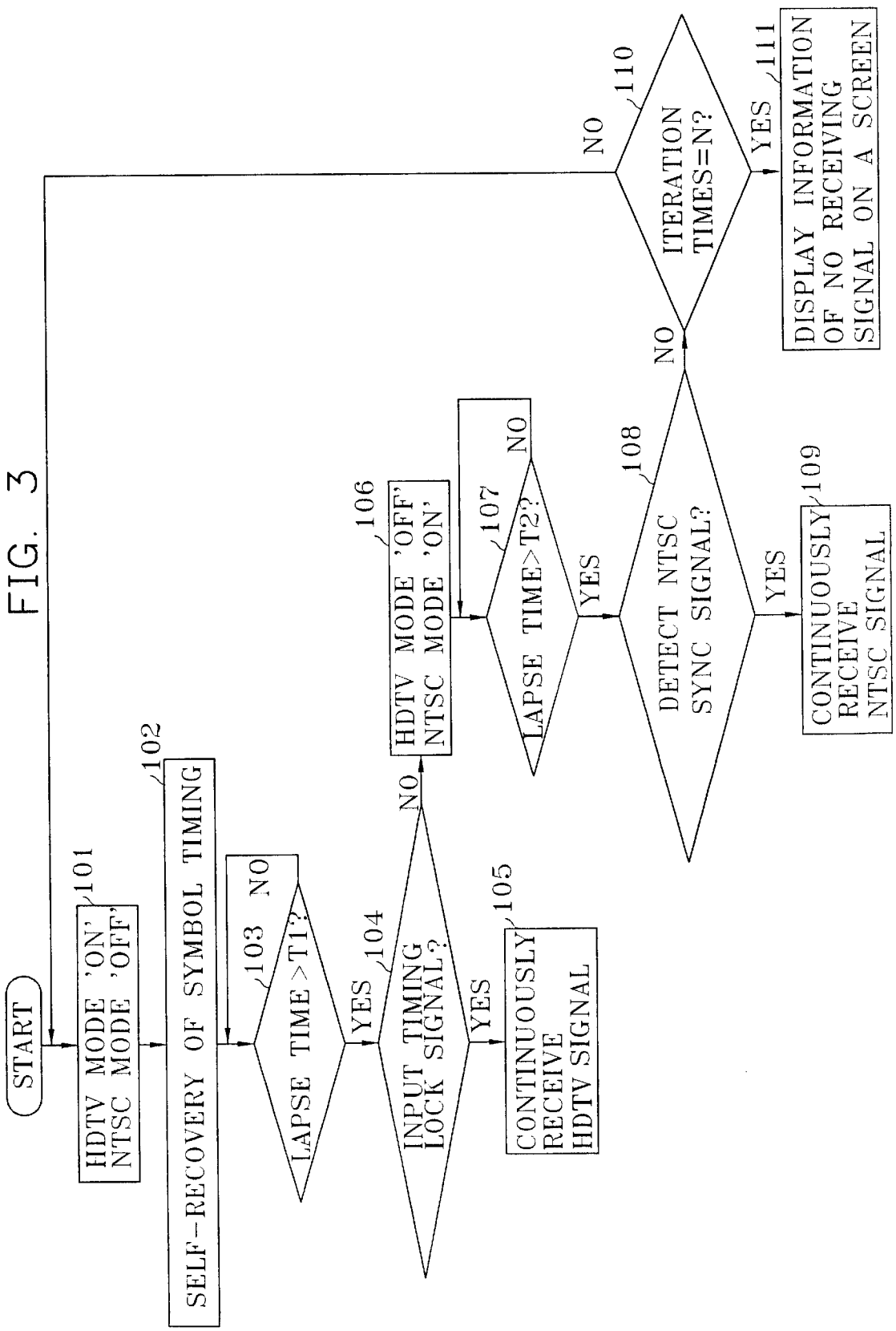

DUAL HDTV/NTSC RECEIVING METHOD USING SYMBOL TIMING RECOVERY AND SYNC SIGNAL DETECTION AND APPARATUS THEREOF

BACKGROUND OF THE INVENTION

1. Field of the Invention

The present invention relates to a high definition television (HDTV) receiver and, more particularly, to a HDTV receiver that is also capable of receiving NTSC signals.

The instant application is based on Korean Patent Application No. 94-37542, which is incorporated herein by reference for all purposes.

2. Brief Discussion of Related Art

Recently, the United States has elected the 8-VSB (Vestigial Side Band) modulation method as the designated method for HDTV transmission. It will be noted that HDTV broadcasting is initially planned to be put into service together with a conventional NTSC broadcasting. Thus, the HDTV receiver will be required to have a function capable of receiving both HDTV signals and conventional NTSC signals.

A dual-mode receiver for receiving HDTV signals and NTSC signals has been developed which is capable of processing the received signals by a HDTV or NTSC method according to a user's selection. One such receiver, which is disclosed in U.S. Pat. No. 5,283,653 entitled "DUAL HDTV/NTSC RECEIVER USING SEQUENTIALLY SYNTHESIZED HDTV AND NTSC CO-CHANNEL CARRIER FREQUENCIES" to Citta (Feb. 1, 1994) includes a dual HDTV/NTSC television receiver able to automatically select an appropriate signal when tuned to a selected television channel. This receiver selectively receives HDTV and NTSC television signals in one channel, among a plurality of channels, in which HDTV signals are of an inherently lower power than the co-channel NTSC signals. A tuner in the receiver initially synthesizes a carrier frequency associated with the HDTV signal of the selected channel, and a narrow band sync detector detects the HDTV signal using the synthesized HDTV carrier frequency. A microprocessor enables further processing of either the HDTV signal or the NTSC according to the detection result of the HDTV signal.

The present invention was motivated by a desire to provide an improved HDTV/NTSC receiver while avoiding the problems inherent in the conventional receiver discussed above.

SUMMARY OF THE INVENTION

An object of the present invention is to provide a novel HDTV/NTSC receiver using symbol timing recovery and a sync signal detection.

Another object of the present invention is to provide a method of receiving both HDTV signals and NTSC signals using symbol timing recovery and sync signal detection.

These and other objects, features and advantages according to the present invention are provided by a receiver for selectively receiving HDTV television signals and NTSC television signals in a plurality of television channels. Preferably, the receiver includes:

a tuning unit for converting a desired one of HDTV signals and NTSC signals into an intermediate frequency signal;

a sync detector, coupled to receive the intermediate frequency signal output from the tuning unit, for detecting a sync signal of the NTSC signal;

a timing recovery unit, coupled to receive the intermediate frequency signal output from the tuning unit, for self-recovering symbol timing of the applied HDTV signal, and outputting a symbol timing lock signal and an analog-to-digital converted HDTV signal;

a controller for judging whether the currently received television signal is either a NTSC signal or a HDTV signal based on the sync detection result of the sync detector and the symbol timing lock signal from the timing recovery unit, and for outputting a control signal according to the determination result; and a tuning controller for initially controlling the tuning unit so that one desired HDTV signal is received, and for subsequently controlling the tuning unit on the basis of the signal selected by the control signal among respective signals output from the tuning unit and the timing recovery unit.

These and other objects, features and advantages according to the present invention are provided by a method of receiving a signal of a desired channel in HDTV/NTSC television receiver. Advantageously, the method includes steps for:

(a) initially tuning a receiving signal to accept an HDTV signal of a desired channel and converting the tuned signal into an intermediate frequency signal;

(b) performing a self-recovery operation of symbol timing using the intermediate frequency signal generated during step (a) and generating a signal indicating a respective self-recovery result;

(c) tuning a receiving signal to accept a NTSC signal of the desired channel and converting the tuned signal into an intermediate frequency signal, if self-recovery operation of symbol timing is not accomplished during step (b);

(d) carrying out detection of the horizontal/vertical sync signal of the NTSC signal using the intermediate frequency signal generated in step (c), and providing a signal indicative of a detection result; and (e) continuously receiving the HDTV signal when the self-recovery result signal indicates that symbol timing is self-recovered, and continuously receiving the NTSC signal when the detection result signal indicates that the horizontal/vertical sync signal is detected.

These and other objects, features and advantages of the invention are disclosed in or will be apparent from the following description of preferred embodiments.

BRIEF DESCRIPTION OF THE DRAWINGS

The preferred embodiments are described with reference to the drawings in which:

FIG. 3 is a flow chart for illustrating an operation the apparatus of FIG. 1, with particular emphasis on the operation of a mode controller depicted in FIG. 1.

DETAILED DESCRIPTION OF THE PREFERRED EMBODIMENT

A preferred embodiment of the present invention will be described below in more detail with reference to the accompanying drawings of FIGS. 1 to 3.

It will be appreciated that HDTV signals are suppressed so that video and audio information can be transmitted in frequency bands of 6 MHz for every channel. The HDTV signals provided by the transmitter are randomized for signal power, so as to be uniformly distributed in the television channel broadcasting bands of 6 MHz. This randomization makes a receiver perform a channel equalization operation, the randomized signal advantageously allows the receiver to recover symbol timing using a self-timing recovery procedure.

In the case of the HDTV signal according to the U.S. standard, i.e., the 8-VSB modulation method, a separate segment sync signal for symbol timing recovery and a reference signal having a constant frequency for carrier recovery are transmitted together with data. Preferably, the segment sync signal of four (4) bits is inserted between each 828 data symbols. Thus, the HDTV receiver can be tuned to frequencies of the input HDTV signal using the segment sync signal and reference signal. However, since a HDTV signal is transmitted at a low power level when compared with the NTSC signal, at the initial operation of the system, detection of the segment sync signal and the reference signal may be difficult. Therefore, almost complete recovery for the carrier from the low power HDTV signal should be carried out first. The more complete the recovery of carrier is, the more accurate the symbol timing recovery can be.

It should be noted that, in order to shorten an initializing time of the HDTV receiver, it is advantageous to, in the first place, adopt self-timing recovery by a symbol timing recovery unit rather than a sync signal. It will be appreciated that the NTSC signal is formatted so that the HDTV receiver can not extract data of the transmission rate of the HDTV signal from the NTSC signal passed through the symbol timing recovery unit. Accordingly, it is impossible that symbol timing recovery unit can be stably operated. The present invention proposes a dual receiver capable for receiving HDTV and NTSC signals, which automatically detects the type of signal source and determines an optimal receiving mode based on the difference of HDTV signals and NTSC signals.

It should be noted that a preferred embodiment of the present invention employs symbol timing recovery unit having a self-timing recovery operation. Of course, it is possible to develop an alternative embodiment of the dual HDTV/NTSC receiver employing monitoring of the operation of symbol timing recovery unit using the segment sync signal.

Figure 1:
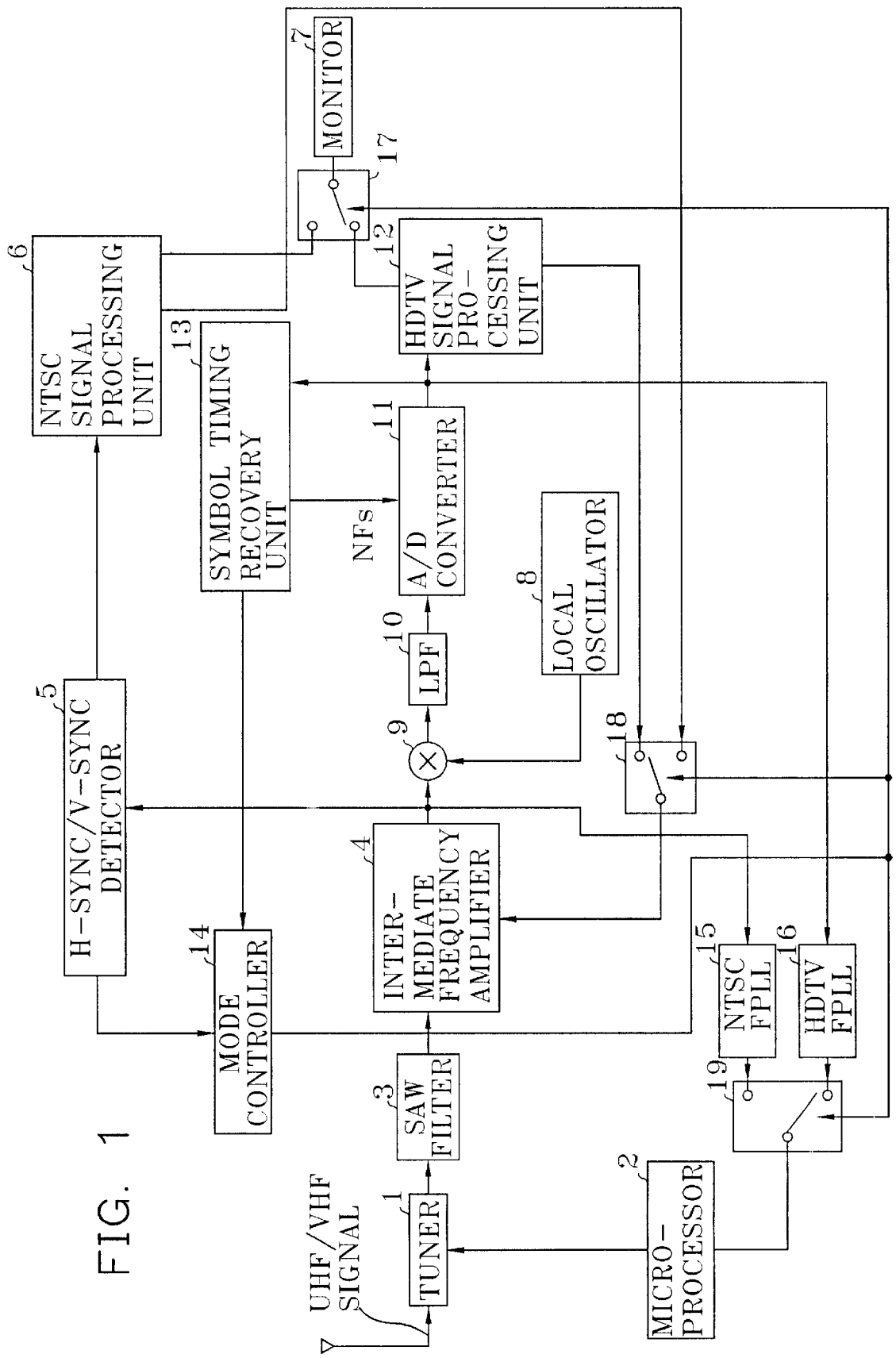
FIG. 1 is a high level block diagram showing a dual HDTV/NTSC receiver in accordance with a preferred embodiment of the present invention.

Turning now to the figures, FIG. 1 shows the dual HDTV/NTSC receiver in accordance with a preferred embodiment of the present invention. A tuner 1 of FIG. 1 advantageously receives a broadcasting signal of a desired channel among UHF/VHF broadcasting signals and converts it to an intermediate frequency (IF) signal. A microprocessor 2 selects a channel that is to be output by tuner 1 while also controlling the ancillary operations of tuner 1. The IF signal output by tuner 1 is applied to a surface acoustic wave (SAW) filter 3, which exactly filters the IF signal to produce a signal having 6 MHz band width. An intermediate frequency (IF) amplifier 4 advantageously controls the gain of the filtered IF signal input from SAW filter 3 according to the output signal from a NTSC signal processing unit 6 or a HDTV signal processing unit 12 feedback via a second switch 18, and outputs a signal amplified to an appropriate level. Output signals from IF amplifier 4 are supplied to a horizontal/vertical sync detector 5, mixer 9 and NTSC frequency phase locked loop (FPLL) circuit 15, respectively. It will be appreciated that the above described tuner 1, SAW filter 3 and IF amplifier 4 can be used for processing both HDTV signals and NTSC signals.

Horizontal/vertical sync detector 5 detects horizontal and vertical sync signals from the output signal of IF amplifier 4, and signals a mode controller 14 whether a sync signal is detected or not. In case that the received signal is a NTSC signal, horizontal/vertical sync detector 5 denotes the detection of the sync signal to mode controller 14. NTSC signal processing unit 6 processes the output signal of horizontal/vertical sync detector 5 so that the output signal can be displayed on a monitor 7, and outputs the processed signal via a first switch 17. FPLL circuit 15 for recovering a carrier of the NTSC signal receives the output signal of IF amplifier 4, judges whether a carrier signal of the desired channel is accurately recovered, and outputs a correcting value of frequency error as the judgement result to a third switch 19.

Preferably, mixer 9 multiplies the output signal of IF amplifier 4 by an oscillation signal having a constant frequency from a local oscillator 8. It should also be noted that mixer 9 can alter the output signal of intermediate frequency amplifier 4 to a signal about the base band through frequency band conversion, so that full digital signal processing for the HDTV signal can be performed. Local oscillator 8 has a fixed oscillation frequency. A low pass filer (LPF) 10 removes unnecessary frequency components from the output signal of mixer 9.

An analog-to-digital converter 11 samples a HDTV signal of the base band output from LPF 10 under the control of symbol timing recovery unit 13. Since the symbol transmission rate Fs of the HDTV signal is about 10.76 MHz, A/D converter 11 samples the input signal about the base band responsive to frequency NFs, i.e., integer N times of symbol transmission rate Fs. The output signal of A/D converter 11 advantageously is applied to symbol timing recovery unit 13, HDTV signal processing unit 12 and HDTV FPLL circuit 16, respectively. Symbol timing recovery unit 13 receives the sampled HDTV signal and designates a sampling point to be used by A/D converter 11 in order to sample the input signal in the same interval and phase as that occurring at the transmitter. Detailed construction and operation of symbol timing recovery unit 13 will now be described with particular reference to FIG. 2.

Figure 2:
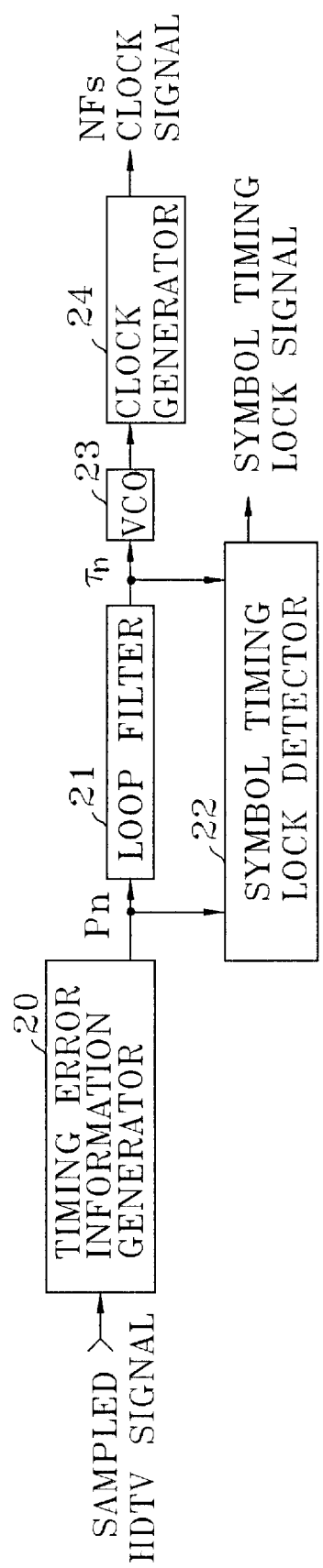
FIG. 2 is a high level block diagram illustrating an exemplary internal structure of a symbol timing recovery unit which is usable in the HDTV/NTSC receiver of FIG. 1.

Referring to symbol timing recovery unit 13 of FIG. 2, timing error information generator 20 calculates an error between an optimized sampling point of time and a sampling point of time of the sampled HDTV signal supplied from A/D converter 11. The calculation result, i.e., error information Pn is advantageously individually applied to a loop filter 21 and a symbol timing lock detector 22. Loop filter 21 is employed for filtering the input error information $P_n$, and preferably includes a phase locked loop (PLL) circuit (not shown). Characteristics of loop filter 21 may be represented by the following equation:

$$\tau_s(n+1) = \begin{cases} \tau_s(n) - \mu_1 P_n & (1\text{st}) \\ \tau_s(n) - \mu_1 P_n - \mu_2 \sum_{k=1}^{n} P_k & (2\text{nd}) \end{cases}$$

where $\tau_s(n+1)$ and $\tau_s(n)$ are output signals of the loop filter at (n+1)-th point of time and n-th point in time, respectively, $P_n$ and $P_k$ are error information, and the first and second cases represent the operation of loop filter of the first PLL and second PLL in (n+1)-th point of time, respectively. The output signal $\tau_n$ of loop filter 21 is supplied to both symbol timing lock detector 22 and a voltage controlled oscillator (VCO) 23, respectively. Symbol timing lock detector 22 monitors either the output signal $P_n$ of timing error information generator 20 or the output signal $\tau_n$ of loop filter 21, and judges whether the symbol timing recovery is successfully made according to the variation degree of each value. More specifically, if an average value of the output signal $P_n$ of timing error information generator 20 is about "O" or the output signal $\tau_n$ of loop filter 21 is constant without variation, symbol timing lock detector 22 determines that sampling is made at the optimized point and outputs the symbol timing lock signal. VCO 23 outputs an analog sine wave signal having an oscillation frequency which is varied according to the output signal $\tau_n$ of loop filter 21. A clock generator 24, which is connected to an output terminal of VCO 23, compares the sine wave signal with a reference signal and outputs a clock signal of frequency NFs, i.e., integer N times the symbol transmission rate Fs, to A/D converter 11, as previously described.

Referring again to FIG. 1, HDTV signal processing unit 12 receives the HDTV signal sampled by A/D converter 11, and processes it for display on monitor 7 by output of the processed signal via first switch 17. HDTV FPLL circuit 16, which is a circuit for recovering a carrier of the HDTV signal, receives the output signal of A/D converter 11, judges whether a carrier signal of a desired channel is accurately recovered, and outputs a correcting value representing frequency error.

Mode controller 14, which is preferably coupled to output terminals of horizontal/vertical sync detector 5 and symbol timing recovery unit 13, determines whether the receiver is to be operated in either a HDTV mode or a NTSC mode. The determination depends on whether a sync signal and a symbol timing lock signal are input or not, and control signals based on such determination are supplied to first through third switches 17–19. Of these first through third switches 17–19, first switch 17 is coupled to selectively supply the output signal of either NTSC signal processing unit 6 or HDTV signal processing unit 12 to monitor 7. Second switch 18 is coupled to selectively output the output signal of either NTSC signal processing unit 6 or HDTV signal processing unit 12 to intermediate frequency amplifier 4. Third switch 19 is connected to selectively output the output signal of either NTSC FPLL circuit 15 or HDTV FPLL circuit 16 to microprocessor 2, which controls the oscillation frequency of tuner 1 in response to the correcting value of a frequency error value supplied from NTSC FPLL circuit 15 or HDTV FPLL circuit 16.

The operation of the FIG. 1 apparatus will now be described in more detail with reference to the flow chart of FIG. 3 showing the signal processing process of mode controller 14.

When the FIG. 1 apparatus initially operates according to the supply of system power, mode controller 14 controls first to third switches 17–19 so that the HDTV mode is 'on' and the NTSC mode is 'off' (step 101). During step 101, first and second switches 17 and 18 select the output of HDTV signal processing unit 12, and third switch 19 chooses that of HDTV FPLL circuit 16. At this time, microprocessor 2 controls tuner 1 so that it is tuned for the recovery of the HDTV signal from the selected channel.

Symbol timing recovery unit 13 performs the self-recovery operation of symbol timing. By this operation, when the data transmitted at transmission rate Fs has a randomized characteristic, symbol timing can be exactly extracted within hundreds and thousands of symbols.

The symbol timing lock signal representative of the result of self-recovery is applied to mode controller 14 (step 102).

Mode controller 14 judges whether the HDTV signal is input, based on the input symbol timing lock signal, and thereby judges whether the symbol timing lock signal is input from symbol timing recovery unit 13, after a predetermined time T1 during step 103, at step 104. When it is judged that the symbol timing lock signal is present at step 104, mode controller 14 judges that symbol timing recovery unit 13 has stabilized and controls switches 17–19 in order to receive the HDTV signal continuously (step 105). During step 104, if the symbol timing lock signal is absent, mode controller 14 controls first to third switches 17–19 so that the NTSC mode is 'on' and the HDTV mode is 'off' (step 106). During step 106, first and second switches 17 and 18 select the output of NTSC signal processing unit 6 and third switch 19 chooses that of NTSC FPLL circuit 15. Mode controller 14 judges the presence or absence of the NTSC signal based on whether a horizontal or vertical sync signal from horizontal/vertical sync detector 5 is present or not. When a predetermined time T2 expires during performance of step 107, it is judged whether the horizontal or vertical sync signal is input following the preset time T2 (step 108). At step 108, if the horizontal or vertical sync signal is present, mode controller 14 controls switches 17–19 in order to receive the NTSC signal subsequently. If the horizontal or vertical sync signal is not detected at step 108, a set of the above processes (steps 101–108) are iterated, after determining as the NTSC signal is not present. During step 110, when the number of iteration times becomes 'N', mode controller 14 determines that no signal is received and takes a set of predetermined actions, such as displaying information indicating that no signal has been received on a screen (step 111).

As described above, the present invention automatically determines whether a receiving television signal is either a NTSC signal or a HDTV signal to thereby improving convenience to the user, based on symbol timing self-recovered from the received HDTV signal and a sync signal detected from the received NTSC signal. Particularly, as the receiving signal is automatically determined, receivable signals with respect to the whole channels can be stored in advance in memory when setting up the television receiver. The apparatus of the present invention provides an effect that no checking process as to the receiving signal is input with regard to each channel, is required, whenever the user turns on the system.

While only certain embodiments of the invention have been specifically described herein, it will apparent that numerous modifications may be made thereto without departing from the spirit and scope of the invention.

What is claimed is:

1. A receiver for selectively receiving one of a HDTV television signal and a NTSC television signals coexisting in a plurality of television channels, the apparatus comprising:

tuning means for converting a desired one of said HDTV and said NTSC signals into an intermediate frequency signal;

sync detection means, coupled to receive said intermediate frequency signal output from said tuning means, for detecting a sync signal of the NTSC signal;

timing recovery means, coupled to receive the intermediate frequency signal output from said tuning means, for self-recovering symbol timing of an applied HDTV signal, and outputting a symbol timing lock signal, indicating whether or not symbol timing is locked, and an analog-to-digital converted HDTV signal;

control means for judging whether a currently received television signal is said NTSC signal or said HDTV signal based on the sync detection result of said sync detection means and the symbol timing lock signal from said timing recovery means, and for outputting a control signal according to a respective determination result; and tuning control means for initially controlling said tuning means so that the desired HDTV signal is received, and for subsequently controlling said tuning means on the basis of the respective signal selected by said control signal among said HDTV and NTSC signals output from said tuning means and said timing recovery means.

2. The receiver as claimed in claim 1, wherein said timing recovery means comprises:

a band converter for converting the intermediate frequency signal output from said tuning means into a base band signal;

an A/D converter for sampling and analog-to-digital converting the base band signal output from said band converter, according to an applied clock signal; and symbol timing recovery unit for recovering symbol timing based on the output signal of said A/D converter, and supplying the symbol timing recovered clock signal to said A/D converter, so as to sample the HDTV signal corresponding to the base band signal.

3. The receiver as claimed in claim 2, wherein said band converter comprises:

a local oscillator for producing an oscillation frequency signal; and a mixer for mixing the intermediate frequency signal of said tuning means with the oscillation frequency signal of said local oscillator so as to convert the HDTV signal into said base band signal.

4. The receiver as claimed in claim 2, wherein said A/D converter samples the base band signal at a frequency which is an integer multiple of a respective symbol transmission rate in said HDTV signal.

5. The receiver as claimed in claim 2, wherein said symbol timing recovery means comprises:

a timing error information generator for generating error information between an optimized sampling point in time and a sampling point in time of the HDTV signal supplied from said A/D converter;

a loop filter, receiving the error information from said timing error information generator, for generating a control voltage;

a lock detector for monitoring said error information output by said timing error information generator and said control voltage output by said loop filter and for generating a symbol timing lock signal corresponding to a monitoring result; and a clock generator for generating a clock signal having an oscillation frequency which is varied according to said control voltage of said loop filter.

6. A receiver for selectively receiving one of a HDTV television signal and a NTSC television signals coexisting in a plurality of television channels, the apparatus comprising:

tuning means for converting a desired one of said HDTV and said NTSC signals into an intermediate frequency signal;

sync detection means, coupled to receive said intermediate frequency signal output from said tuning means, for detecting a sync signal of the NTSC signal;

timing recovery means, coupled to receive the intermediate frequency signal output from said tuning means, for self-recovering symbol timing of an applied HDTV signal, and outputting a symbol timing lock signal and an analog-to-digital converted HDTV signal;

control means for judging whether a currently received television signal is said NTSC signal or said HDTV signal based on the sync detection result of said sync detection means and the symbol timing lock signal from said timing recovery means, and for outputting a control signal according to a respective determination result; and tuning control means for initially controlling said tuning means so that the desired HDTV signal is received, and for subsequently controlling said tuning means on the basis of the respective signal selected by said control signal among said HDTV and NTSC signals output from said tuning means and said timing recovery means;

wherein said timing recovery means comprises:

a band converter for converting the intermediate frequency signal output from said tuning means into a base band signal;

an A/D converter for sampling and analog-to-digital converting the base band signal output from said band converter, according to an applied clock signal; and symbol timing recovery unit for recovering symbol timing based on the output signal of said A/D converter, and supplying the symbol timing recovered clock signal to said A/D converter, so as to sample the HDTV signal corresponding to the base band signal;

wherein said timing recovery means comprises:

a timing error information generator for generating error information between an optimized sampling point in time and a sampling point in time of the HDTV signal supplied from said A/D converter;

a loop filter, receiving the error information from said timing error information generator, for generating a control voltage;

a lock detector for monitoring said error information output by said timing error information generator and said control voltage output by said loop filter and for generating the symbol timing lock signal corresponding to a monitoring result; and a clock generator for generating a clock signal having an oscillation frequency which is varied according to said control voltage of said loop filter; and;

wherein operational characteristics of said loop filter at an (n+1)-th point in time are represented by the following equation:

$$\tau_s(n+1) = \begin{cases} \tau_s(n) - \mu_1 P_n & \text{(1st)} \\ \tau_s(n) - \mu_1 P_n - \mu_2 \sum_{k=1}^{n} P_k & \text{(2nd)} \end{cases}$$

where $\tau_s(n+1)$ and $\tau_s(n)$ are output signals of said loop filter at said (n+1)-th and n-th points in time, respectively, $P_n$ and $P_k$ are error information, and respective first and second cases represent the operation of said loop filter in first phase locked loop (PLL) and second PLL modes of operation, respectively.

7. The receiver as claimed in claim 5, wherein said lock detector generates the symbol timing lock signal indicating that sampling is carried out at the optimized point of time, when an average value of said error information is about "O" or the control voltage of the loop filter is substantially constant.

8. The receiver as claimed in claim 5, wherein said clock generator generates a clock signal having a frequency which is an integer multiple of the symbol transmission rate in said HDTV signal.

9. The receiver as claimed in claim 1, wherein said control means determines that the currently received television signal is said HDTV signal when the symbol timing lock signal is supplied from said timing recovery means, and determines that the currently received television signal is said NTSC signal when a horizontal sync signal or a vertical sync signal is supplied from said sync detector.

10. A receiver for selectively receiving one of a HDTV television signal and a NTSC television signals coexisting in a plurality of television channels, the apparatus comprising:

tuning means for converting a desired one of said HDTV and said NTSC signals into an intermediate frequency signal;

sync detection means, coupled to receive said intermediate frequency signal output from said tuning means, for detecting a sync signal of the NTSC signal;

timing recovery means, coupled to receive the intermediate frequency signal output from said tuning means, for self-recovering symbol timing of an applied HDTV signal, and outputting a symbol timing lock signal and an analog-to-digital converted HDTV signal;

control means for judging whether a currently received television signal is said NTSC signal or said HDTV signal based on the sync detection result of said sync detection means and the symbol timing lock signal from said timing recovery means, and for outputting a control signal according to a respective determination result; and tuning control means for initially controlling said tuning means so that the desired HDTV signal is received, and for subsequently controlling said tuning means on the basis of the respective signal selected by said control signal among said HDTV and NTSC signals output from said tuning means and said timing recovery means;

wherein said tuning control means comprises:

a first frequency phase sync loop circuit, coupled to receive the output signal of said tuning means, for judging whether the carrier of a desired said NTSC signal is exactly recovered and generating a first correcting value of frequency error according to a judgement result;

a second frequency phase sync loop circuit, coupled to receive the analog-to-digital converted said HDTV signal of said timing recovery means, for judging whether a carrier of a desired said HDTV signal is exactly recovered and generating a second correcting value of frequency error according to the judgement result;

a switching unit for selecting the correcting values of respective frequency errors applied from said first and second frequency phase sync loop circuits according to the control signal of said control means; and a microprocessor for controlling said tuning means based on the selected one of said first and said second correcting values supplied from said switching unit.

11. The receiver as claimed in claim 1, wherein said receiver further comprises display means for displaying that no receivable signal is in the selected channel, in the case that the control signal of said control means indicates that neither said HDTV signal nor said NTSC signal are in said selected channel.

12. A method of receiving a signal of a desired channel in HDTV/NTSC television receiver, the method comprising the steps of:

(a) initially tuning a receiving signal to correspond to a HDTV signal of the desired channel and converting the tuned signal into an intermediate frequency signal;

(b) attempting a self-recovery operation with respect to symbol timing using the intermediate frequency signal generated during said step (a) and generating a first signal indicating whether or not symbol timing is locked;

(c) tuning a receiving signal corresponding to a NTSC signal of the desired channel and converting the tuned signal into an intermediate frequency signal, when said first signal indicates that symbol timing is not locked (b);

(d) detecting one of horizontal and vertical sync signals of the NTSC signal using the intermediate frequency signal generated during said step (c), and generating a second signal indicative of a respective detection result; and (e) continuously receiving one of the HDTV signal when said first signal indicates that symbol timing is locked, and continuously receiving the NTSC signal when said second signal indicates that one of said horizontal and said vertical sync signals is detected.

13. The method as claimed in claim 12, wherein said step (b) comprises the step of judging whether the self-recovery of symbol timing is accomplished after a predetermined time period has elapsed.

14. The method as claimed in claim 12, wherein said step (d) comprises the step (d) of judging whether one of said horizontal or said vertical sync signals is detected after a predetermined time period.

15. The method as claimed in claim 12, wherein said method further comprises the step (f) of iterating said steps (a) to (e) when said first signal indicates no self-recovery and said second signal indicates no detection of one of said horizontal and said vertical sync signals.

16. The method as claimed in claim 15, wherein said method further comprises the step (g) of displaying that no receivable signal is in the selected channel, in the case that neither said self-recovery operation of the symbol timing is achieved nor one of said horizontal and said vertical sync signals is detected after performing said step (f) a predetermined number of times.

17. A receiver for selectively receiving one of a HDTV television signal and a NTSC television signals coexisting in a plurality of television channels, the apparatus comprising:

tuning means for converting a desired one of said HDTV and said NTSC signals into an intermediate frequency signal;

sync detection means, coupled to receive said intermediate frequency signal output from said tuning means, for detecting a sync signal of the NTSC signal;

timing recovery means, coupled to receive the intermediate frequency signal output from said tuning means, for self-recovering symbol timing of an applied HDTV signal, and outputting a symbol timing lock signal, indicating whether or not symbol timing is locked in response to generated timing error information, and an analog-to-digital converted HDTV signal;

control means for judging whether a currently received television signal is said NTSC signal or said HDTV signal based on the sync detection result of said sync detection means and the symbol timing lock signal from said timing recovery means, and for outputting a control signal according to a respective determination result; and tuning control means for initially controlling said tuning means so that the desired HDTV signal is received, and for subsequently controlling said tuning means on the basis of the respective signal selected by said control signal among said HDTV and NTSC signals output from said tuning means and said timing recovery means.

18. A method of receiving a signal of a desired channel in HDTV/NTSC television receiver, the method comprising the steps of:

(a) initially tuning a receiving signal to correspond to a HDTV signal of the desired channel and converting the tuned signal into an intermediate frequency signal;

(b) attempting a self-recovery operation with respect to symbol timing using the intermediate frequency signal generated during said step (a) and generating a first signal indicating whether or not symbol timing is locked in response to generated timing error information;

(c) tuning a receiving signal corresponding to a NTSC signal of the desired channel and converting the tuned signal into an intermediate frequency signal, when said first signal indicates that symbol timing is not locked (b);

(d) detecting one of horizontal and vertical sync signals of the NTSC signal using the intermediate frequency signal generated during said step (c), and generating a second signal indicative of a respective detection result; and (e) continuously receiving one of the HDTV signal when said first signal indicates that symbol timing is locked, and continuously receiving the NTSC signal when said second signal indicates that one of said horizontal and said vertical sync signals is detected.

* * * * *